C. L. Ames.
Carriage Evener.
No. 71262            Patented Nov. 26, 1867.
Fig. 1.
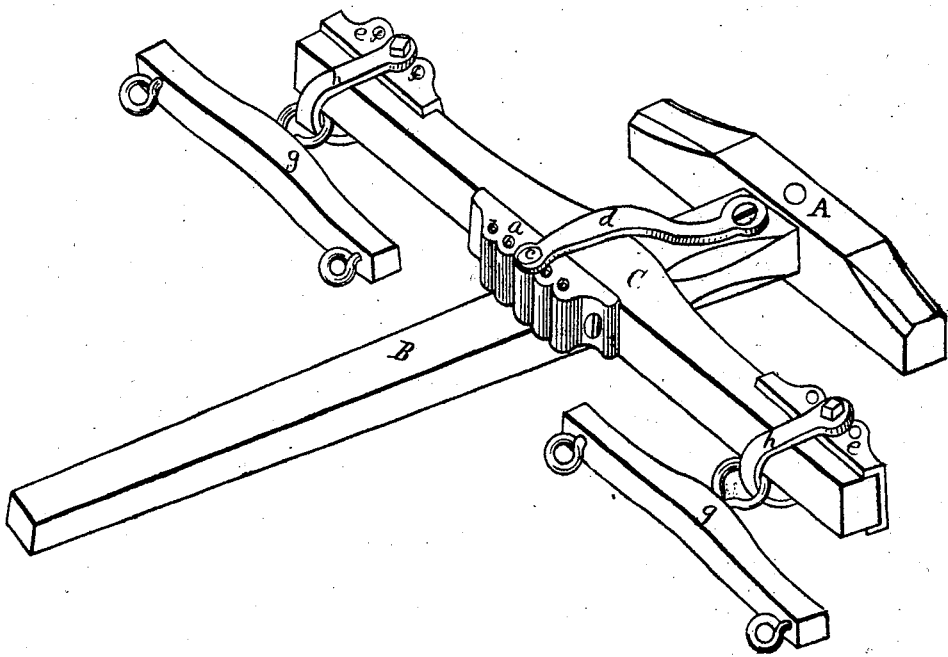
Fig. 2.          Fig. 3.
Witnesses.          Inventor.
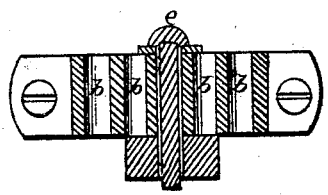
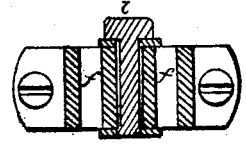
H. K. Porter
Joseph Reed
Charles L. Ames
By T. W. Porter
His Atty

United States Patent Office.

CHARLES L. AMES, OF BANGOR, MAINE.

Letters Patent No. 71,262, dated November 26, 1867.

IMPROVEMENT IN CARRIAGE-EVENERS.

*The Schedule referred to in these Letters Patent and making part of the same.*

TO ALL WHOM IT MAY CONCERN:

Be it known that I, CHARLES L. AMES, of Bangor, in the county of Penobscot, and State of Maine, have invented a new and useful Improvement in Carriage-Eveners; and I do hereby declare that the following is a full, clear, and exact description of the construction and operation of the same, reference being had to the accompanying drawings, making a part of this specification, in which—

Figure 1 is a perspective view,

Figure 2 is a vertical section taken on line V W, and

Figure 3 is a vertical section taken on line X Y.

Similar letters of reference indicate corresponding parts in the several figures.

The nature of my invention consists in rendering the evener of vehicles readily adjustable, by which to equalize the strength of unequally matched animals attached thereto; to accomplish which a metallic plate, formed with a plurality of holes for the draught-pin, is attached to the centre of the evener, while, by means of similar places attached to its ends, the whiffle-trees are adjusted for the same purpose.

To enable others skilled in the art to make and use my invention, I will proceed to describe its construction and operation.

Throughout the principal portion of the United States, when horses or mules are worked side by side, attached to vehicles, it is through the medium of an evener, which is secured to the pole by a central pin, upon which the evener vibrates, the whiffle-trees being attached to the ends of the evener. This method of attaching animals to the vehicle possesses the advantage of compelling each of the animals to draw a portion of the load, whether they move evenly or not; and in starting, the movement of the quicker animal serves to stimulate the slower one to action, while, as an attendant disadvantage, each animal must, whether weaker or stronger, draw half the load; and as in practice but few animals are equally matched in strength and endurance, the burdens are, in fact, not equally borne. And to furnish a cheap, easy, and practical method of equalizing the labor of animals of unequal strength, is the object of my invention.

In the drawings, A represents the central portion of the axle. B is the pole, and C is the evener, to the front side of which, at the centre, is attached the metallic plate $a$, passing vertically through which are five holes, $b\ b$. The draught-bolt $c$ passes down through the draught-rod $d$, the plate $a$, and pole B, as shown. Attached to the respective ends of the evener, upon the back side, are the metallic plates $e\ e$, each of which has three holes, $ff$, passing vertically through it, and the whiffle-trees $g\ g$ are attached thereto by the clevises $h\ h$, which are pivoted to the plates $e\ e$ by the bolts $i\ i$. Thus the evener is pivoted and vibrates freely upon the bolt $c$, and the whiffle-trees are pivoted to the evener, as described.

In practice, when either animal from inferior strength requires the longer arm of the evener, the draught-bolt $c$ is passed through such one of the holes $b$ other than the centre one, as to give the required advantage to the weaker animal; and as the variation produced by changing the point of draught of one of the whiffle-trees to the extent of one hole, is but half that produced by changing the point of draught at the centre the same distance, therefore whenever the variation cannot be made at the centre with sufficient accuracy, by changing one of the whiffle-trees in the proper direction, any practical degree of accuracy of adjustment may be reached. By the use of this invention the evener is stronger than if the draught-bolt passed through it in the usual manner, and by reason of the close proximity of the holes to each other, which would not be practical if the draught-bolt passed through the evener, the desired degree of accuracy can be attained in all cases.

Having thus described my invention, what I claim as new, and desire to secure by Letters Patent, is—

1. The central adjusting-plate $a$, when constructed and combined with the evener in manner substantially as and for the purposes specified.

2. The whiffle-tree adjusters $e\ e$, when constructed and combined with the evener and whiffle-trees, substantially as described and shown.

CHARLES L. AMES.

Witnesses:
S. W. KING,
E. J. CROLY.